United States Patent Office 3,395,837
Patented Aug. 6, 1968

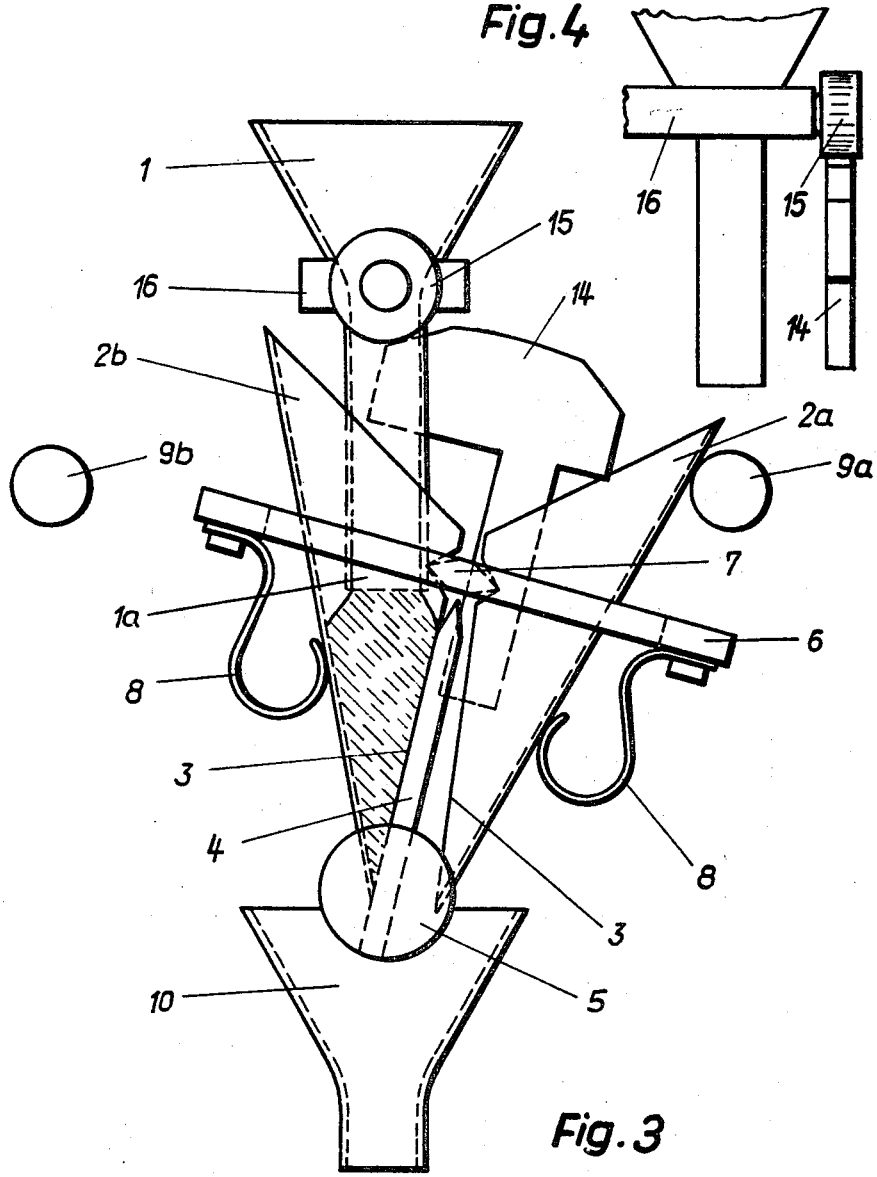

3,395,837
DEVICE FOR MEASURING PULVERULENT MATERIAL
Georg Kopp, Neuhausen am Rheinfall, Switzerland, assignor to Schweizerische Industrie-Gesellschaft, Neuhausen am Rheinfall, Switzerland
Filed Jan. 3, 1966, Ser. No. 518,262
Claims priority, application Switzerland, Jan. 4, 1965, 17/65; Sept. 29, 1965, 13,434/65
7 Claims. (Cl. 222—277)

ABSTRACT OF THE DISCLOSURE

A device for measuring pulverulent material provided with at least one pair of pivotally mounted funnel-type containers which are U-shaped in cross-section whereby the open sides of the two U's face each other and are alternately closed by a common closure wall arranged between said containers. Both containers are pivotally moved, first in one direction and then in the other, to receive material from a supply and alternately engage said common closure wall to form a closed measuring cell with one of said containers, while the other container not engaging said common closure wall discharges its measured content into a funnel.

---

The present invention relates to a device for measuring pulverulent material. The aim of the invention is to provide a measuring device which has a high output and in which no sealing surfaces are present which are subjected to wear and tear by friction.

According to the present invention a device for measuring pulverulent material comprises at least one pair of pivotally mounted, open sided containers arranged one on each side of the common closure wall and a stop member associated with each container and adapted to abut against the container in an end position of the latter, the containers and wall on the one hand and the stop members on the other hand being displaceable relative to one another whereby in an end position one of the containers abuts against its associated stop member and is pivoted away from the wall whilst the other container is urged into sealing engagement with the wall to form a closed measuring cell.

Preferably, the wall is pivotable to move the containers against the stop members. The containers are pivotally mounted in a frame and urged against the wall by springs carried on the frame.

Figure 1:
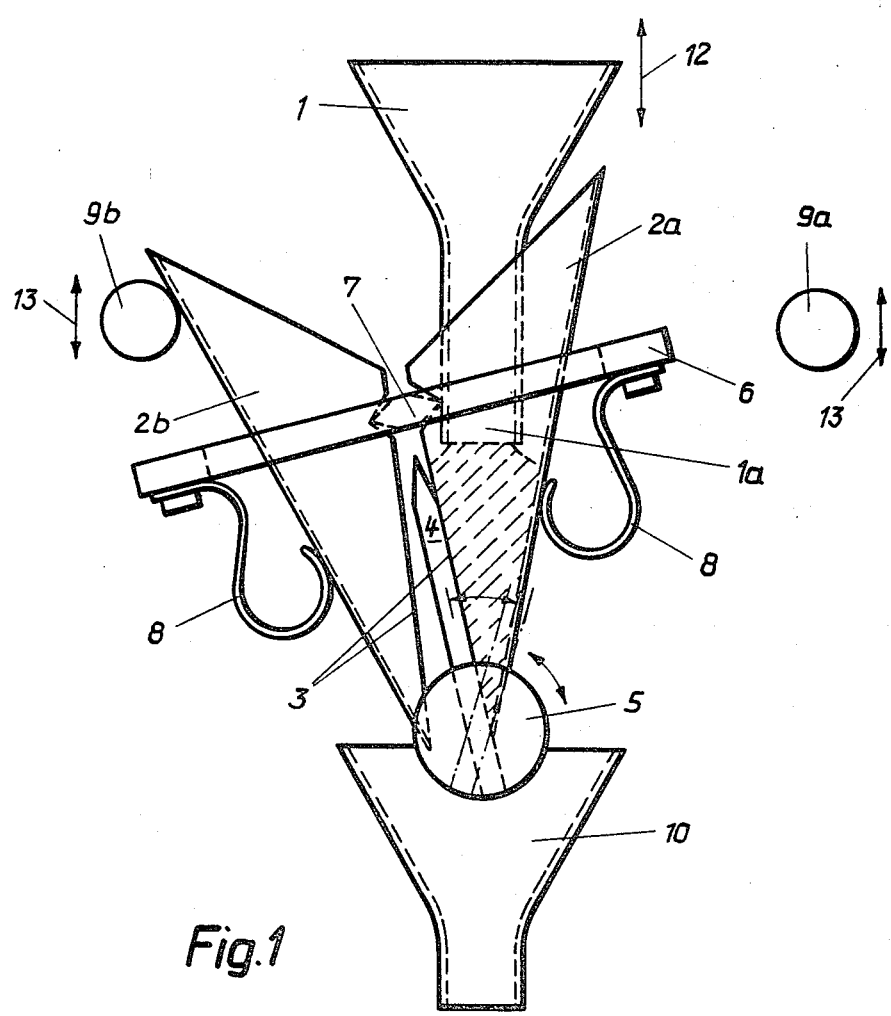
Figure 2:
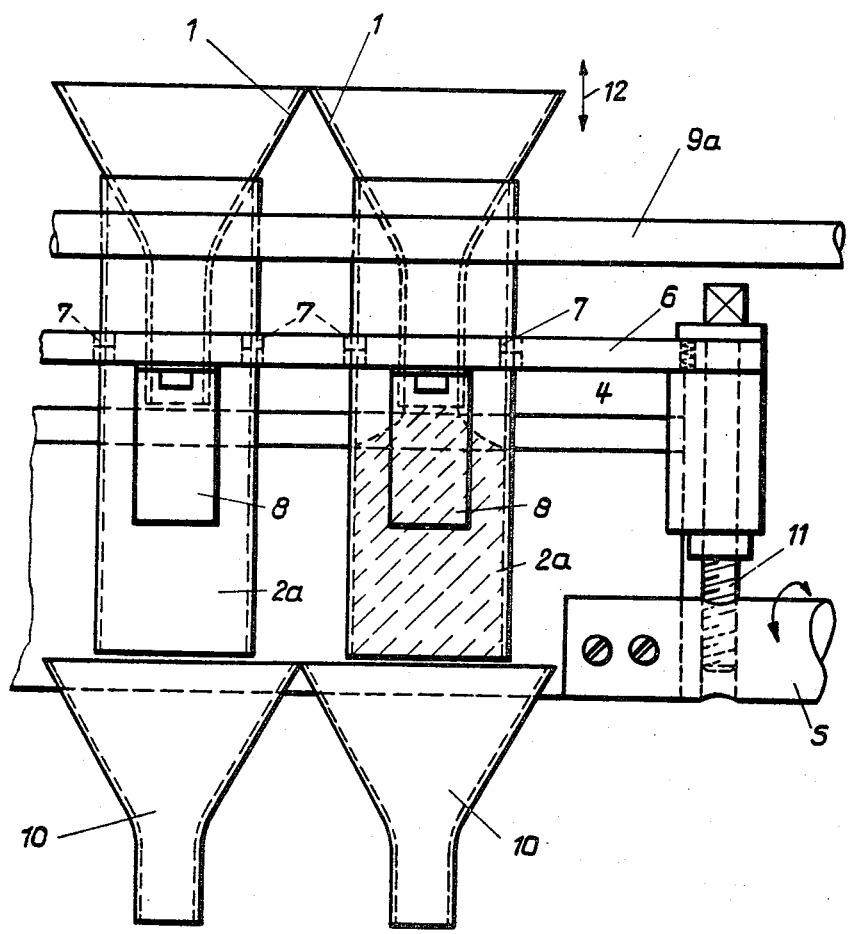

The invention will be further described by way of example, with reference to the accompanying drawings, in which:

FIG. 1 is an end elevation of a measuring device;
FIG. 2 is a side elevation of the device shown in FIG. 1;
FIG. 3 is an end elevation of a second embodiment of a measuring device; and
FIG. 4 is a side view of a part of the feed hopper utilised in FIG. 3.

Pulverulent material to be measured out is fed through a feed hopper 1 into a tapered container 2a or 2b. The containers 2a and 2b are U-shaped in cross-section and the facing edges 3 of the open sides of the containers are shaped to fit tightly against a common wall 4 located between the containers. The container whose edges 3 abut against the wall (in FIG. 1 the element 2a) then forms together with the wall 4 a measuring cell, closed at the bottom.

The wall 4 is fixedly mounted on a shaft 5 which is rotatable through a certain angle. A frame 6 arranged about the containers has centre crosspieces 7 running in the direction of the longitudinal axis of the shaft 5. Two wedges are arranged on the crosspieces 7 and serve as swivel axes by engaging in corresponding recesses in the edges 3 of the containers 2a and 2b. The frame 6 carries springs 8 which urge the containers 2a, 2b against the wall 4.

Two stops 9a and 9b are located one on each side of the feed hopper 1 above the frame 6. When a container and the wall 4 are pivoted about the shaft 5 away from the aperture 1a of the hopper that part of the outer wall of the container above the frame 6 comes to rest against the appropriate stop. In so doing the container pivots about the centre crosspiece 7, (container 2b in FIG. 1), so that the edges 3 are lifted off the wall 4 to form an outlet through which the pulverulent material can fall into a discharge funnel 10. A conveyor can be arranged beneath the funnel 10 to carry bags or receptacle to receive the pulverulent material.

The apparatus operates in the following manner. Upon rotating the shaft 5, for example, in an anticlockwise direction, the container 2a, as shown in FIG. 1, is brought under the outlet 1a of the feed hopper 1. The filling level of the hopper 1 is kept under control by known means, in order to provide the conditions for a regular dosage. The spring 8 presses the containers 2a against the wall 4, so as to form a measuring cell, which receives pulverulent material poured in through the hopper 1, until the material reaches the level of the outlet 1a of the hopper. The cell is then full as no more material can flow out of the hopper.

The shaft 5 is then rotated in a clockwise direction to pivot the wall 4 and the frame 6 and bring container 2b beneath the hopper. The left-hand spring 8 then presses the container 2b against the wall 4 to form a measuring cell into which the pulverulent material can now flow.

When in this position, the outer wall of the container 2a comes in contact with the stop 9a. As a result of this the container 2a tilts about the centre crosspiece 7, so that its edges 3 are lifted off the wall 4 and the pulverulent material can flow out into the funnel 10. When the measuring cell formed by the container 2b and the wall 4 is full, the wall 4 and the frame 6 are pivoted into the other stop position to repeat the operation.

In order to change the amount of material being measured the frame 6 with it the containers 2a and 2b can be adjusted in height with respect to the wall 4 by means of a screw 11 (see FIG. 2). This changes the capacity of each measuring cell which is determined by the volume of the cell beneath the outlet 1a of the hopper 1. This adjustment of the frame 6 by the screw 11 is a coarse adjustment. A fine adjustment is effected by a change in the height of the hopper 1 by movement in the direction indicated by the double arrow 12. The width of the container outlet formed by the gap between the edges 3 of container 2a or 2b and the wall 4, as well as the period during which it is open, can be adjusted by an alteration in height of the stops 9a or 9b as indicated by the double arrow 13. This makes it possible to adapt the discharge rate to the actual volume measured as well as to the properties of the product.

As may be seen from FIG. 2 a number of measuring cells can be placed side-by-side. The wall 4 and the stops 9a and 9b are then constructed as bars extending across the cells.

In the illustrated embodiment, the wall 4 together with the containers are moved relative to the hopper 1 and the stops 9a and 9b. The hopper and stops are firmly fixed on a framework. Obviously, however, the relative displacement necessary for the operation of the measuring cells can be achieved by moving the hopper together with the stops with respect to a stationary wall. The relative adjustment, can also be obtained by the displacement of both groups of members against one another.

In the illustrated embodiment it is only possible to obtain a relatively small change in the measured amount since, on the one hand, the outlet 1a of the feed hopper must not be lowered to an extent to interfere with the pivotal movement of the wall and, on the other hand, must not be raised to a height where no material can flow over the wall into the other measuring cell.

The embodiment illustrated in FIGS. 3 and 4 makes possible an increase in the range of measured quantities. In this embodiment a sequence switch cam is connected to the pivotable wall, which cam temporarily raises the feed hopper extending into the containers when the wall is pivoted from one end position into the other. The outlet 1a of the feed hopper can thereby extend further into the measuring cells without hindering the movement of the wall.

As is shown in FIG. 3, stops 9a and 9b are placed above the frame 6 on both sides of the feed hopper 1, so that the container which is pivoted away from the hopper aperture 1a, rests with the part of its outer wall extending above the frame 6 against the associated stop. In this way the container (container 2a in FIG. 3), is pivoted about the centre crosspiece 7, so that the inside edges 3 are raised off the wall 4 whereby to provide an outlet through which pulverulent material can be discharged into funnel 10. As before a conveyor, for example, carrying bags or the like to receive the material can be arranged below the funnel.

A cam member 14 is fixed on the wall 4 and therefore pivots with the wall. The cam cooperates with a roller 15, which is mounted on the feed hopper by means of a crossmember 16.

In operation by rotating the shaft 5, for example in a clockwise direction, the container 2b, as shown in FIG. 3, is brought beneath the aperture 1a of the hopper 1. The filling level of the funnel 1 is controlled by known means, in order to provide the conditions necessary for a uniform measurement. The spring 8 presses the container 2b against the wall 4, so that they form together a measuring cell, into which pulverulent material flows from the hopper 1 until it reaches the level of aperture 1a of the hopper. No more powder then flows into the measuring cell. The shaft 5 is then rotated in an anticlockwise direction to pivot the wall 4 carrying the cam 14 and the frame 6 into the left-hand end position. In so pivoting cam member 14 lifts the roller 15 and hence the fed hopper 1 to enable the upper edge of the wall 4 to pass beneath the aperture 1a of the hopper. The right-hand spring 8 then presses the container 2a against the wall 4 and the pulverulent material flows into this container 2a.

In the left-hand end position, the outer wall of the element 2b comes into contact with the stop 9b. It thereby pivots about the centre crosspiece 7, so that its edges 3 are raised off the wall and the pulverulent material contained therein can flow out into the funnel 10. When the measuring cell formed from the container 2a and the wall 4 is filled, the wall 4 and the frame 6 are again pivoted into the other end position to repeat the operation.

I claim:
1. A device for measuring pulverulent material, including a common closure wall, at least one pair of pivotally mounted open sided containers arranged one on each side of said closure wall, and a stop member associated with each of said containers and adapted to abut against its associated container in an end position of the latter, the containers and the wall on the one hand and the stop members on the other hand being displaceable relative to one another whereby in an end position one of the containers abuts against its associated stop member and is pivoted away from the wall, while the other container is urged into sealing engagement with the wall to form a measuring cell, and means for pivotally supporting said wall for displacing said containers against the stop members.

2. A device for measuring pulverulent material according to claim 1, including a frame, springs carried on the frame, the containers being pivotally mounted on said frame and urged against said wall by said springs.

3. A device for measuring pulverulent material according to claim 1, including a hopper which extends successively into the containers, and means for adjusting said hopper in height.

4. A device for measuring pulverulent material according to claim 1, including a hopper which extends successively into the containers, and means for adjusting said hopper in height, said means including a cam member which is secured to the wall to project above the wall, a cam follower on the hopper adapted to cooperate with said cam member whereby to raise the hopper on relative displacement between the containers and the wall on the one hand and the stop members and the hopper on the other hand.

5. A device for measuring pulverulent material according to claim 4, wherein said cam follower comprises a roller journalled on the hopper.

6. A device according to claim 1, including a feed hopper extending successively into said containers, and a control cam on said wall which is adapted to temporarily raise said feed hopper during the movement of said wall.

7. A device according to claim 1, including a feed hopper extending successively into said containers, a control cam on said wall adapted to temporarily raise said feed hopper during the movement of said wall, and a roller mounted on said fed hopper for cooperation with said control cam.

References Cited
UNITED STATES PATENTS 660,794    10/1900    Hanak et al.   ------ 177—97 X
1,215,559    2/1917    Leake.

ROBERT B. REEVES, *Primary Examiner.*

HADD S. LANE, *Assistant Examiner.*